United States Patent [19]

Seidl

[11] Patent Number: 4,494,489
[45] Date of Patent: Jan. 22, 1985

[54] CYLINDER HEAD FOR FOUR-CYCLE INTERNAL COMBUSTION ENGINES

[75] Inventor: Jiri Seidl, Munich, Fed. Rep. of Germany

[73] Assignee: Bayerische Motoren Werke A.G., Fed. Rep. of Germany

[21] Appl. No.: 521,371

[22] Filed: Aug. 8, 1983

[30] Foreign Application Priority Data

Aug. 10, 1982 [DE] Fed. Rep. of Germany ....... 3229723

[51] Int. Cl.³ .............................................. F01L 1/00
[52] U.S. Cl. ............................. 123/41.31; 123/90.27; 123/188 R
[58] Field of Search ....... 123/188 R, 188 A, 188 AA, 123/188 M, 90.27, 90.46, 193 CH, 193 H, 41.31

[56] References Cited

U.S. PATENT DOCUMENTS 3,164,143  1/1965  Dolza ............................. 123/90.27
4,367,707  1/1983  Suzuki ........................... 123/193 H

FOREIGN PATENT DOCUMENTS 3009279  10/1980  Fed. Rep. of Germany ... 123/90.27
2919213  11/1980  Fed. Rep. of Germany ... 123/90.27

Primary Examiner—William A. Cuchlinski, Jr.
Attorney, Agent, or Firm—Craig & Burns

[57] ABSTRACT

A cylinder head for four-cycle internal combustion engines with a concave combustion space portion, in which are arranged one inlet and one exhaust valve each with a relatively small V-angle; the center axis of the inlet and exhaust valves are located in cross planes offset transversely to the V-angle; the spark gap of a spark plug is offset transversely to the exhaust valve and is arranged approximately in the cross plane of the inlet valve; the V-angle of the valves is pivoted toward the side of the inlet valve with respect to the associated cylinder center axis by an angle of about 2° to about 10°; the combustion space portion in the cylinder head has an approximately flat half streamline cross-sectional shape in the direction of the V-angle whereby the relatively high part of the combustion space portion is arranged within the area of the spark gap and of the exhaust valve; the relatively low portion of the combustion space part narrows in the opposite area containing the inlet valve and the adjacent projection of the associated cylinder bore in a flat wedge-shaped manner and/or into at least a partially circumferential edge squeeze gap.

15 Claims, 3 Drawing Figures

CYLINDER HEAD FOR FOUR-CYCLE INTERNAL COMBUSTION ENGINES

The present invention relates to a cylinder head for four-cycle internal combustion engines.

In a known cylinder head of this type of construction according to SAE Report No. 710148, the V-angle of the valve is arranged symmetrically to the associated cylinder axis. The valves are arranged recessed relatively deeply in the combustion space part of the cylinder head. In order to enable a sufficiently high compression, in conjunction inter alia with a flat piston top, squeeze gaps of relatively large area are arranged transversely to the valves and between spark plug and projection of the cylinder bore. Though these squeeze gaps produce a strong vortexing or turbulence of the charge at the end of the compression stroke, which favors the combustion of the charge, the squeeze gaps impair the progress of the flame front in their own area. As a result thereof, the danger exists that, on the one hand, residual components of the charge remain uncombusted and that, on the other, auto-ignition occurs.

The aim of the present invention resides in so further developing a cylinder head of the aforementioned type of construction that the advantages thereof as regards structural costs and structural space remain preserved but the disadvantages in the combustion progress are avoided and, in particular, a small volume of the combustion space part is achieved for a high compression in cooperation with a flat piston or a flat combustion space portion in the piston.

The underlying problems are solved in accordance with the present invention in that in the projection the angle between inlet valve stem and respectively coordinated cylinder axis is larger by about 2° to 10° than the corresponding angle with the exhaust valve stem, in that a relatively high area of the combustion space recess extending to the respectively coordinated cylinder edge contains the exhaust valve and the spark gap, and in that a gradually tapering area of the recess smoothly adjoining the same contains the inlet valve and falls off to the separating plane between cylinder head and cylinder. By the arrangement of the hot structural parts, namely, of the exhaust valve and of the spark plug, in the relatively high part of the combustion space with large volume proportion, the charge components heated thereat are ignited and combusted first whereas the charge portions arranged at a distance from the spark gap of the spark plug which have a smaller volume proportion are heated less by the relatively cool structural parts present thereat, namely the inlet valve and adjacent combustion space walls, and are thereby seized and ignited by the flame front without the danger of a premature auto-ignition. The same advantages are obtained with a combustion space shape formed only in the cylinder head and having a half-streamlined cross section as also with an additional flat recess in the piston top. The combustion space form according to the present invention is in principle substantially similar to an axially symmetrical lens shape (*Automotive Industries,* July, 1981, page 50) in which, however, the arrangement of the spark plug in the volume center of combustion space with the greatest height thereof is not realizable by reason of the valve arrangement in a common plane. The V-angle of the valves of this prior art arrangement thereby also significantly differs from that of the present invention, whence the structural expenditures for the valve control become greater.

In a further known cylinder head (ATZ 68/2, pages 59-61), the relatively small V-angle of slightly more than 20° is pivoted in the direction toward the inlet valve, however, the valves are arranged in this prior art arrangement recessed in a relatively deep combustion space part of the cylinder head and relatively large squeeze areas are provided on the side of the spark plug as also opposite thereto as well as the required compression is achieved by a top or raised portion of the piston, which breaks up the hood-shaped combustion space. The combustion progress is disadvantageously influenced thereby.

If the connecting line of the center points of the opening cross sections of the inlet and exhaust valves subtends with the cross planes an angle of about 30° to 50°, if in the projection of the cross planes the spark gap of the spark plug is arranged closer to the center point of the opening cross section of the inlet valve than the center point of the opening cross section of the exhaust valve and if the combustion space wall within the area of the spark plug is provided with an inwardly projecting bulge which extends approximately from the edge of the combustion space wall to the end of the spark plug thread on the side of the combustion space at a distance to the cylinder head-cylinder separating plane, then an arrangement of the spark gap of the spark plug in the spatial combustion space center, respectively, in the center of the main volume of the combustion space constructed according to the present invention is possible. According to tests, a very uniform combustion progress both inside of each individual cylinder as well as between several cylinders with successive work strokes is achieved thereby. A partial load operation with a very lean fuel-air mixture and thus with a very low fuel consumption becomes possible thereby.

If in an in-line engine with a valve control by a single cam shaft, the opening cross sections of the inlet and exhaust valves extend closely tangentially to the edge of the combustion space and if the V-angle amounts to between 10° to 20° and preferably is about 14° and the pivot angle to about 3°, then a cylinder head for in-line internal combustion engines is attainable having a construction of the valve control which is particularly favorable from an operating and cost point of view, with a simultaneous large construction of the valve opening cross sections up to the edge of the combustion space portions favorable for the engine power output, whereby additionally favorable alternate charge functions are achieved by the provided V-angle and pivot-angle by reason of the possible channel arrangement leading to the valves. A cost-favorable manufacture of the cylinder head as a unitary die-cast part is possible if a cooling channel which extends free of undercuts in the direction of the combustion space row is arranged in the V-angle space between the stems of the inlet and exhaust valves and determined by the V-angle.

The cylinder head according to the present invention may be further improved constructively, and more particularly with respect to a charge inflow through the inlet channel favorable for the filling and output of the internal combustion engine, with respect to a short exhaust channel in the cylinder head advantageous for slight heat transfer from the exhaust gases to the cylinder head and with respect to a space-saving and cost-favorable arrangement of fuel injection nozzles, auxiliary inlet- and/or exhaust return-channels, if the inlet channels subtend a relatively small angle of about 40° to 60° with the inlet valves and the exhaust channels a relatively large angle of about 80° with the exhaust valves, and if the fuel injection valves, the auxiliary inlet-channels and/or exhaust gas return-channels are arranged in the angular space between the inlet channels and the separating plane between cylinder and cylinder head. The arrangement of the inlet channels, of the fuel injection nozzles as well as of the auxiliary inlet-channels and/or exhaust gas return-channels additionally has an influence on the combustion progress in the combustion space since the mixture formation and mixture distribution and thus the combustion progress in the combustion space are decisively determined thereby.

These and other objects, features and advantages of the present invention will become more apparent from the following description when taken in connection with the accompanying drawing which shows, for purposes of illustration only, two embodiments in accordance with the present invention, and wherein.

Figure 1:
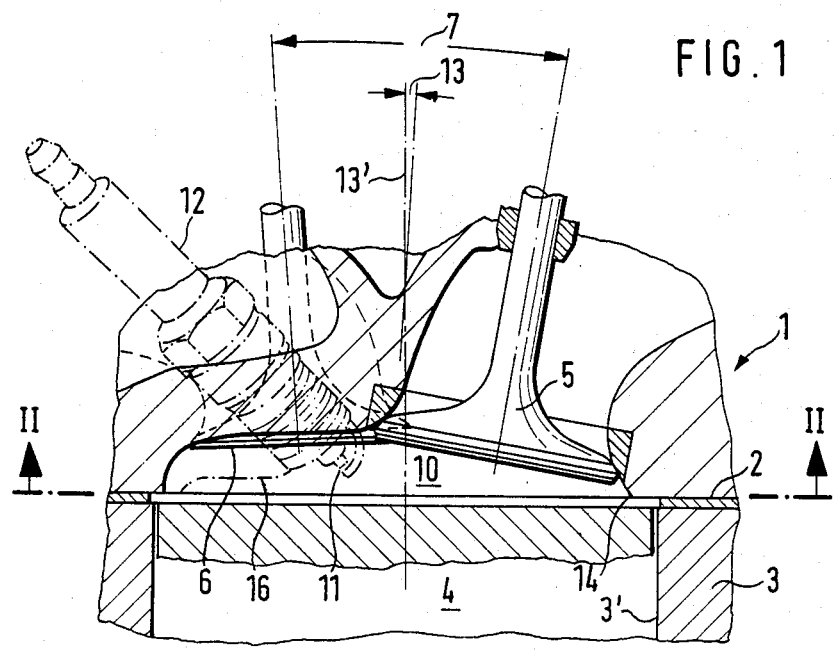
FIG. 1 is a simplified cross-sectional view of a cylinder head for four-cycle internal combustion engines within the area of the combustion space, taken along line I—I of FIG. 2.
Figure 2:
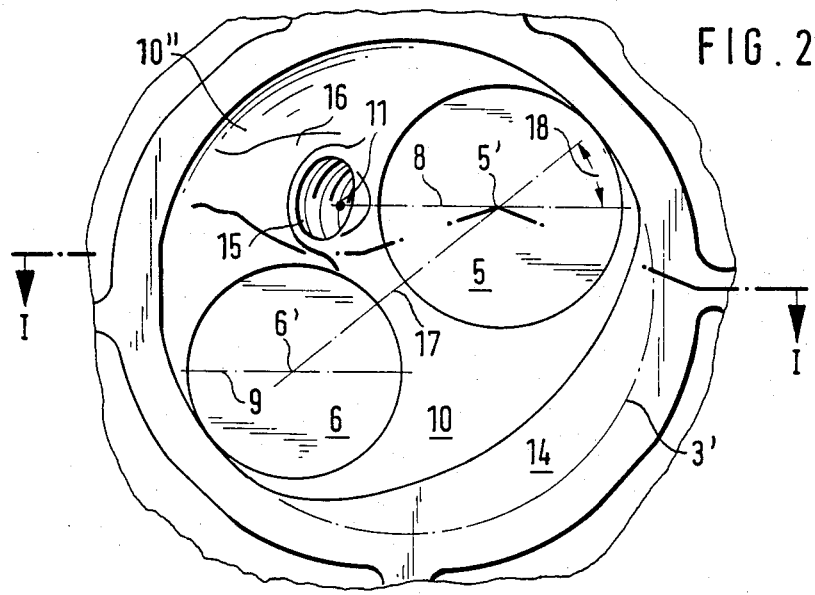
FIG. 2 is a view of the combustion space interior of the cylinder head, taken along line II—II of FIG. 1.

Referring now to the drawing, wherein like reference numerals are used throughout the various views to designate like parts, a cylinder head generally designated by reference numeral 1 for a four-cycle internal combustion engine adjoins with its separating plane 2 a cylinder 3, in which is arranged a piston 4. One inlet valve 5 and one exhaust valve 6 each with a V-angle 7 (FIGS. 1 and 3) of their stems are arranged in the cylinder head 1 and are disposed in parallel planes 8 and 9 offset transversely to the V-angle 7 (FIG. 2). The disks of the inlet and exhaust valves 5 and 6 are arranged recessed in a flat concave combustion space wall 10 formed in the cylinder head 1. The piston 4 is constructed in FIG. 1 without any combustion space portion with a flat top, however, it may also contain a flat concave combustion space wall as recess 10′ (FIG. 3).

The spark gap 11 of a spark plug 12 is arranged in the combustion space 20 within the cylinder head 1 approximately in the cross plane 8 of the inlet valve 5. The spark gap 11, viewed in the direction of the cross planes 8 and 9, is closer to the center point 5′ of the opening cross section of the inlet valve 5 than to the center point 6′ of the opening cross section of the exhaust valve 6. The V-angle 7 of the stems of the inlet and exhaust valves 5 and 6 is preferably from 10° to 20° and ideally amounts to about 14° and is pivoted in the direction toward the inlet valve 5 by an angle 13 of from 2° to 10° about 3° (FIGS. 1 and 3). As a result of this arrangement, the combustion space wall 10, viewed in the direction of the V-angle 7, has according to FIGS. 1 and 3 a flat approximately drop- or stream-line-shaped contour. This contour is relatively high within the area of the exhaust valve 6 and of the spark plug 12 and narrows flat wedge-shaped within the area of the inlet valve 5 and of the adjacent areas up to an edge squeeze-gap 14 extending partially along the projection of the bore 3′ of the cylinder 3. The combustion space wall includes an inwardly projecting bulge 16 for fastening the spark plug 12 by means of a spark plug thread 15 and for the spatial arrangement of the spark gap 11 of the spark plug 12 in the volume center of the combustion space.

As can be seen from FIG. 2, the center points 5′ and 6′ of the inlet and exhaust valves 5 and 6, respectively, inlet and exhaust valve opening cross sections, lie on a connecting line 17 which subtends a relatively small angle 18 of 30° to 50° and preferably of about 40° with the cross planes 8 and 9. The spark gap 11 of the spark plug 12 receives thereby a position which, viewed in the direction of the cross planes 8 and 9, lies closer to the center point 5′ of the inlet valve 5 than to the center point 6′ of the exhaust valve 6 and therewith is substantially in the center of the combustion space volume.

Figure 3:
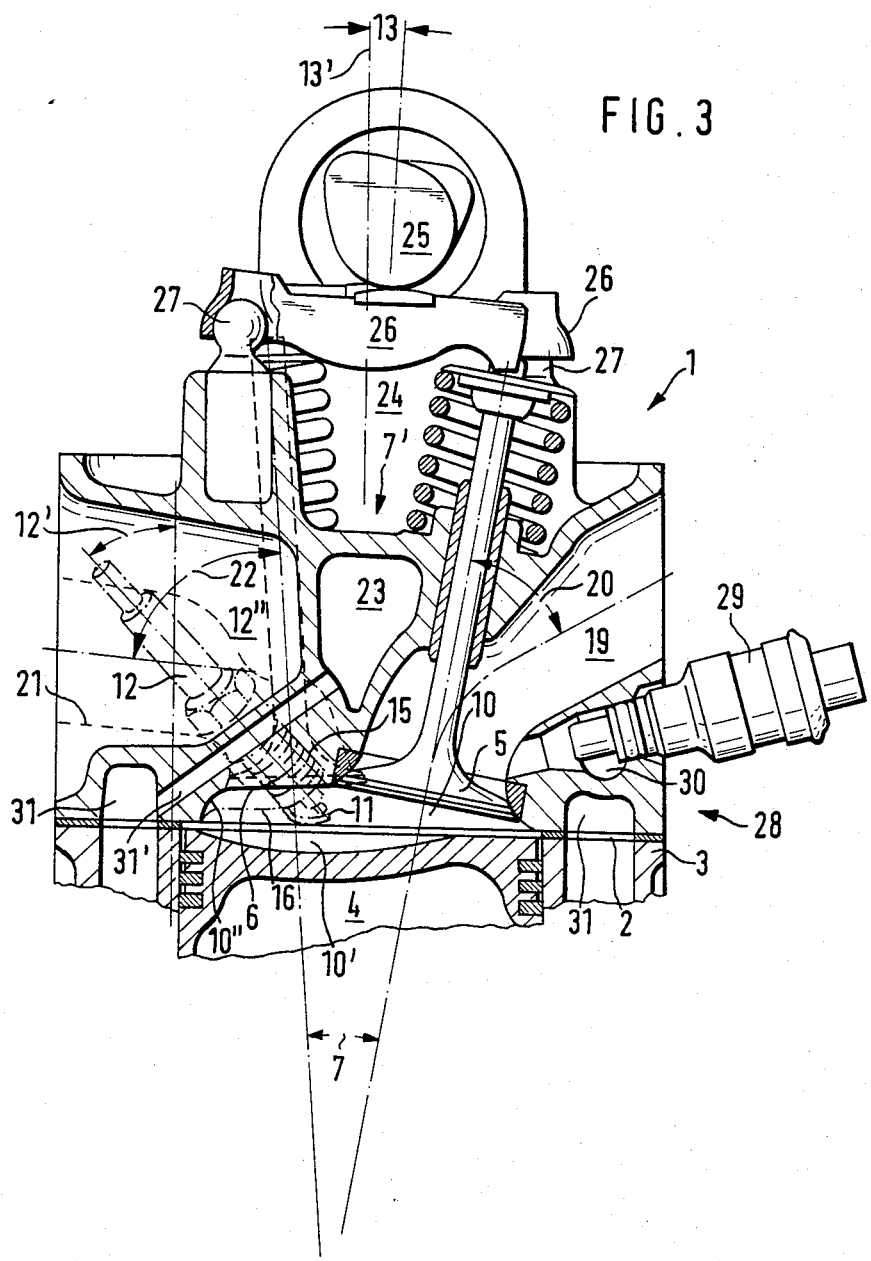
FIG. 3 is a cross-sectional view of a complete cylinder head of slightly modified construction and corresponding to FIGS. 1 and 2.

As can be seen from FIG. 3, the inlet channel 19 and the stem of the inlet valve 5 subtend a relatively small angle 20 of about 40° to 60° and ideally of about 50°. The exhaust channel 21 and the stem of the exhaust valve 6, in contrast thereto, subtend a relatively large angle 22 of about 80°. A favorable flow against the disk of the inlet valve 5 is thus obtained for the inlet channel 19 whereas, in contrast thereto, a relatively short length exists for the exhaust channel 21 inside of the cylinder head 1. The spark plug 12 is arranged considerably more flat than the stem of the exhaust valve 6 and more particularly under an angle 12′ of about 40° to 50° and preferably of about 45°. The spark plug 12 is screwed into the spark plug thread 15 inside of a spark plug recess 12″ of the cylinder head 1, which is open toward the outside. A continuous cooling channel 23 which extends in the longitudinal direction of the cylinder head 1 without undercut, is arranged in the V-angle space 7′ between the stems of the inlet and exhaust valves 5 and 6 and between the inlet and exhaust channels 19 and 21 as well as the spark plug 12. The valve control space 24 adjoins on top of the cooling channel 23, in which the cam shaft 25 is supported in a tunnel and opposite rocker arms 26 are supported on ball-shaped support bearings 27 and are drivingly connected with the inlet and exhaust valves 5 and 6.

Fuel injection nozzles 29 and auxiliary inlet channels 30 as well as cooling recesses 31 open toward the separating plane 2 and connected with the cooling channel 23 are arranged in the angle space 28 between the separating plane 2 and the inlet channels 19.

In addition to the very cost-favorable cylinder head 1 which can be constructed as a one-piece die-casting and to the valve control with a single cam shaft 25, rocker arms 26 and ball-shaped support bearings 27, a very space- and weight-saving construction of the overall structure of the cylinder head 1 is realizable with the present invention. Owing to the slight cooling medium content of the cooling channel 23 and of the cooling space recesses 31 as well as of the connecting bores 31′ thereof, the slight overall mass of the cylinder head 1 also entails advantages for a rapid warm-up after the cold start of the engine and thus for slight fuel consumption. The configuration of the combustion space wall 10 serves the same purpose. The latter is constructed in the illustrated cross sections in the cylinder head as flat drop- or streamline-shape. The parts which are relatively hot during operation, namely the exhaust valve 6 and the spark plug 12, respectively, the spark gap 11 thereof, are arranged as boundary of the relatively high part of the shape of the combustion space wall 10. The spark gap 11 thereby lies substantially in the center of the combustion space main volume. As a result thereof, the ignition of the charge takes place in the spatial center of the overall combustion space volume so that the flame front is able to expand initially in the main volume from the place of the spark gap 11 and is able to seize first the relatively hot charge portions present thereat. The relatively cold charge portions in the relatively cold area of the inlet valve 5 and of the adjacent parts including the edge squeeze gap 14 is reached by the flame front later, however, as a result of the slight heat-up of the charge within this area, a combustion free of auto-ignition which is also substantially free of residues is assured thereby. The flame front thereby reaches this area last so that at that instant the piston 4 has already enlarged again the squeeze gap 14 and therewith a complete combustion of the charge up to the combustion space edge, respectively, up to the bore 3' of the cylinder 3 is assured. A recess 10' in the top of the piston 4 according to FIG. 3 serves the purpose to match the compression ratio depending on stroke dimensions of the piston to a predetermined bore 3' of the cylinder 3 and to a predetermined combustion space construction in the cylinder head 1. The recess 10' may thereby be constructed, as shown, of flat sequential spherical shape exclusively within the area about the spark gap 11 of the spark plug 12 or may have an also approximately drop-shaped or streamline-shaped configuration approximately symmetrical to the combustion space wall 10 in the cylinder head 1.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A cylinder head for an externally controlled four-cycle internal combustion engine, comprising space means for combustion constructed as a substantially concave flat recess means, one inlet valve and one exhaust valve for the space means whose valve stems are arranged in generally parallel cross planes, the valve stems forming an angle of about 10° to about 20° in a projection perpendicular to the cross planes, and a spark plug whose spark gap is arranged generally in a cross plane of the inlet valve, in the inflow direction of the charge into the space means and generally in the projection of the exhaust valve stem, projection of an angle between the inlet valve stem and a coordinated cylinder axis is larger by about 2° to about 10° than a corresponding angle of the coordinated axis with the exhaust valve stem, a relatively high area of the recess means contains the exhaust valve and the spark gap, and a gradually tapering area of the recess means contains the inlet valve and falls off to a separating plane between the cylinder head and cylinder.

2. A cylinder head according to claim 1, wherein a gradually tapering area of the recess means adjoins smoothly the relatively high area thereof.

3. A cylinder head according to claim 1, wherein a connecting line of the center points of the opening cross sections of the inlet and exhaust valves subtends an angle of about 30° to about 50° with said cross planes.

4. A cylinder head according to claim 3, wherein the spark gap of the spark plug lies in the projection of the cross planes closer to the center point of the opening cross section of the inlet valve than to the center point of the opening cross section of the exhaust valve.

5. A cylinder head according to claim 4, wherein the longitudinal axis of the spark plug is arranged at an angle of about 40° to about 50° to a cylinder center axis, and combustion space wall means of the recess means includes within the area of the spark plug an inwardly projecting bulge which extends generally from the edge of the combustion space wall means to the end of a spark plug thread on the side of the combustion space at a distance to the separating plane between cylinder and cylinder head.

6. A cylinder head according to claim 5, wherein the engine includes an in-line internal combustion engine with a valve control means including a single cam shaft, the opening cross sections of the inlet and exhaust valves extend closely tangentially to the edge of the combustion space means, the angle formed by the projection of the valve stems being about 14° and the angle formed by the projection of the intake valve stem and the coordinated cylinder axis being larger by about 3°.

7. A cylinder head according to claim 6, wherein a cooling channel means extending continuously in the direction of the combustion space row free of undercut is arranged in a V-angle space determined by the angle between the stems of the inlet and exhaust valves.

8. A cylinder head according to claim 7, wherein the engine is an in-line internal combustion engine with inlet and exhaust channel means the inlet channel means subtend a relatively small angle of about 40° to about 60° with the inlet valves, and the exhaust channel means subtend a relatively large angle of about 80° with the exhaust valves, and fuel injection valve means, auxiliary inlet channel means and exhaust gas return-channel means are arranged in an annular space between the inlet channel means and the separating plane between cylinder head and cylinder.

9. A cylinder head according to claim 8, wherein a gradually tapering area of the recess means adjoins smoothly the relatively high area thereof.

10. A cylinder head according to claim 1, wherein the spark gap of the spark plug lies in the projection of the cross planes closer to the center point of the opening cross section of the inlet valve than to the center point of the opening cross section of the exhaust valve.

11. A cylinder head according to claim 1, wherein the longitudinal axis of the spark plug is arranged at an angle of about 40° to about 50° to the cylinder center axis, and combustion space wall means of the recess means includes within the area of the spark plug an inwardly projecting bulge which extends generally from the edge of the combustion space wall means to the end of a spark plug thread on the side of the combustion space at a distance to the separating plane between cylinder and cylinder head.

12. A cylinder head according to claim 1, wherein the engine includes an in-line internal combustion engine with a valve control means including a single cam shaft, the opening cross sections of the inlet and exhaust valves extend closely tangentially to the edge of the combustion space means, the angle formed by the projection of the valve stems being about 14° and the angle formed by the projection of the intake valve stem and the coordinated cylinder axis being larger by about 3°.

13. A cylinder head according to claim 12, wherein a cooling channel means extending continuously in the direction of the combustion space row free of undercut is arranged in a V-angle space determined by the angle between the stems of the inlet and exhaust valves.

14. A cylinder head according to claim 13, wherein the engine includes an in-line internal combustion engine with inlet and exhaust channel means, the inlet channel means subtend a relatively small angle of about 40° to about 60° with the inlet valves, and the exhaust channel means subtend a relatively large angle of about 80° with the exhaust valves, and at least one of fuel injection valve means, auxiliary inlet channel means and exhaust gas return-channel means are arranged in the annular space between the inlet channel means and the separating plane between cylinder head and cylinder.

15. A cylinder head according to claim 1, wherein the engine includes an in-line internal combustion engine with inlet and exhaust channel means, the inlet channel means subtend a relatively small angle of about 40° to about 60° with the inlet valves, and the exhaust channel means subtend a relatively large angle of about 80° with the exhaust valves, and fuel injection valve means, auxiliary inlet channel means and exhaust gas return-channel means are arranged in the annular space between the inlet channel means and the separating plane between cylinder head and cylinder.

* * * * *